2,768,165
Patented Oct. 23, 1956

2,768,165

AMINOALKYLTHIENYL SULFIDES AND METHOD OF PREPARING

Robert David Schuetz, East Lansing, Mich.

No Drawing. Application September 25, 1952,
Serial No. 311,536

11 Claims. (Cl. 260—247.1)

This invention relates to a new composition of matter and to a method of preparing said composition. More particularly this invention pertains to hetero compositions including the thiophene ring.

Heretofore physiological activity has been found in compositions having the thiophene ring as a constituent thereof. An example of one such composition is the antihistaminic, Thenylene, N(α-pyridyl)-N-(α-thenyl)-N',N'-dimethylethylenediamine. It is impossible, however, for one skilled in the art to predict with any degree of accuracy a physiological behavior of related hetero compositions or homologues of known hetero compositions.

The novel hetero compositions of the present invention are variously useful as intermediates in the preparation of useful chemicals and themselves show definite physiological activity. For example, it has been found that certain of the alkyl sulfides of thiophene containing a tertiary amino group exhibit remarkable local anesthetic properties.

It is therefore one of the general objects of the invention to improve the physiological and/or physical properties of the organic sulfides of thiophene, to effect a reduction in the toxicity, to improve the solubility, and to diminish the irritation on injection thereof in order to produce a more effective and useful local anesthetic.

The novel compositions of the present invention have the following general structural formula

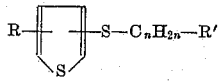

wherein R' represents an alkyl amino or symmetrical and unsymmetrical dialkylamino groups having a total of not more than eight carbon atoms, a piperidino, a morpholino, a pipecolino, or a pyrrolidino group; $n$ represents an integer having a value between two and six inclusive; R represents a hydrogen, methyl or halogen substituted in the 2, 3, 4 or 5 position; and wherein the alkyl sulfide substituent group is in the 2 or 3 position on the thiophene ring.

Specific tertiary amino derivatives of the alkyl thienyl sulfides which have valuable chemical and therapeutic properties are dimethylaminoethyl 3-thienyl sulfide, γ-diethylaminopropyl 3-thienyl sulfide, γ-dibutylaminopropyl 3-thienyl sulfide, β-piperidinoethyl 3-thienyl sulfide, α-methyl-β-piperidinoethyl 3-thienyl sulfide, γ-piperidinopropyl 3-thienyl sulfide, γ-piperidinopropyl 3-(2-chloro)-thienyl sulfide, δ-piperidinobutyl 3-thienyl sulfide, δ-piperidinobutyl 3-(2-chloro)-thienyl sulfide, ε-piperidinoamyl 3-thienyl sulfide, β-morpholinoethyl 3-thienyl sulfide, β-morpholinoethyl 3-(4-methyl)-thienyl sulfide, α-methyl-β-morpholinoethyl 3-thienyl sulfide, γ-morpholinopropyl 3-thienyl sulfide, α-morpholinobutyl 3-thienyl sulfide, ε-morpholinoamyl 3-thienyl sulfide, β-pipecolinoethyl 3-thienyl sulfide, γ-pipecolinopropyl 3-thienyl sulfide, δ-pipecolinobutyl 3-thienyl sulfide, β-pyrrolidinoethyl 3-thienyl sulfide, γ-pyrrolidinopropyl 3-thienyl sulfide, δ-pyrrolidinobutyl 3-thienyl sulfide, dimethylaminoethyl 2-thienyl sulfide, γ-diethylaminopropyl 2-thienyl sulfide, γ-dibutylaminopropyl 2-thienyl sulfide, β-piperidinoethyl 2-thienyl sulfide, α-methyl-β-piperidinoethyl 2-thienyl sulfide, γ-piperidinopropyl 2-thienyl sulfide, α-piperidinobutyl 2-thienyl sulfide, ε-piperidinoamyl 2-thienyl sulfide, β-morpholinoethyl 2-thienyl sulfide, α-methyl-β-morpholinoethyl 2-thienyl sulfide, γ-morpholinopropyl 2-thienyl sulfide, γ-morpholinopropyl 2-(5-chloro)-thienyl sulfide, α-morpholinobutyl 2-thienyl sulfide, ε-morpholinoamyl 2-thienyl sulfide, β-pipecolinoethyl 2-thienyl sulfide, γ-pipecolinopropyl 2-thienyl sulfide, α-pipecolinobutyl 2-thienyl sulfide, β-pyrrolidinoethyl 2-thienyl sulfide, γ-pyrrolidinopropyl 2-thienyl sulfide, δ-pyrrolidinobutyl 2-thienyl sulfide; and the acid addition salts and quaternary ammonium salts of the foregoing bases. The hydrochlorides of the foregoing bases are generally white crystalline solids. While the useful therapeutic properties of these compositions are common to both the bases and the salts thereof, the salts generally constitute the preferred form, since they are water soluble and thus more conveniently used. It therefore should be understood that the claims appended hereto include the compositions in the form of both the free bases and the salts thereof.

The above alkylaminoalkyl 2- or 3-thienyl sulfides are preferably prepared by reacting the corresponding N(ω-chloroalkyl)-amine hydrochloride with a slight excess of 2- or 3-thiophenethiol dissolved in aqueous sodium hydroxide and the tertiary amine is converted to the hydrochloride salt thereof. The N(ω-chloroalkyl)amine hydrochloride is obtained from the N(ω-hydroxyalkyl)amines which are prepared by reacting under anhydrous conditions an excess of the secondary amine with a chlorohydrin having the desired alkyl substituent following generally the procedure described by Clinton et al.; JACS, 71, 3366 (1949). Thus, by treating the N(ω-hydroxyalkyl)amine with thionyl chloride and dry chloroform as described by Mason and Black, JACS, 66, 1443 (1940), the desired N(ω-chloroalkyl) amine hydrochloride is obtained. If desired the N(ω-chloroalkyl)amine, ω-morpholine-n-propylchloride is prepared in a single step reaction by the method of Adams and Whitmore, JACS, 67, 735 (1945).

The foregoing general method of preparing the aminoalkyl 2- or 3-thienyl sulfides of the present invention is summarized as follows:

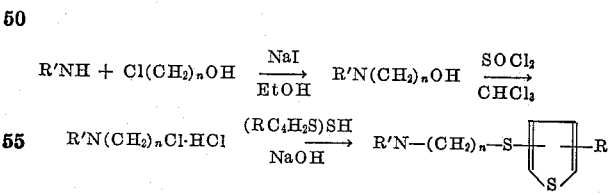

A second general method of preparing (N,N-dialkylamino)-alkyl 2- or 3-thienyl sulfide hydrochlorides involves the preparation of ω-chloroalkyl 2- or 3-thienyl sulfide by carefully adding slight excess of polymethylenechlorohydrin to an aqueous sodium hydroxide solution of 2- or 3-thiophenethiol, and the hydroxyalkyl 2- or 3-thienyl sulfide treated with thionyl chloride dissolved in pyridine. The resulting chloroalkyl 2- or 3-thienyl sulfide is reacted with the desired secondary amine in dry benzene to give the desired aminoalkyl 2- or 3-thienyl sulfide. The final products of each of the foregoing general reactions are found to be identical.

The second general method of preparing aminoalkyl 2- or 3-thienyl sulfide of the present invention is summarized as follows:

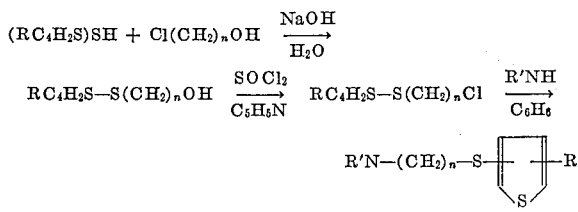

The ω-chloroalkyl 2- and 3-thienyl sulfide used in the foregoing general reaction are also prepared by the direct interaction of the appropriate polymethylene chlorobromide and 2- or 3-thiophenethiol. The yields obtained in the latter reaction, however, are somewhat less than obtained from the foregoing two step procedure.

The present invention is illustrated by the following specific examples, but it should be understood that the invention is not limited to the precise compositions or to the precise procedure described in the several specific examples which are set forth by way of illustration only.

EXAMPLE I

β-PIPERIDINOETHYL 3-THIENYL SULFIDE HYDROCHLORIDE

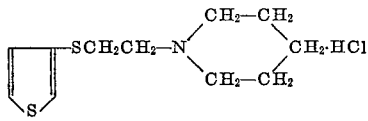

a. Preparation of β-piperidinoethyl alcohol

In a 500 ml. three necked flask fitted with a stirrer and reflux condenser is placed 80 g. (1.0 mol) of ethylenechlorohydrin, 166 g. (2.0 mol) of piperidine, and 7.5 g. of sodium iodide dissolved in 225 ml. of absolute ethanol. The mixture is heated moderately and within one hour a precipitate of piperidine hydrochloride forms. The reaction is continued for 24 hours or until there is no further precipitation. After allowing the reaction mixture to cool to room temperature, it is treated with a solution of 22 g. of sodium metal dissolved in 200 ml. of absolute alcohol. The precipitate of inorganic salts which forms is filtered and washed with 350 ml. portions of dry ethyl ether and the combined filtrate and washings are distilled until a temperature of 110° C. is reached in the column head to remove ether alcohol and unreacted piperidine. The remaining inorganic salts are removed by filtration and washed with ether, and the washings are combined with the filtrate. Following the removal of the ether on a steam bath, the residue is vacuum distilled in a column to yield the clear oily liquid product having an unpleasant odor and boiling at 90–92° C. at a pressure of 16–17 mm. of mercury.

b. Preparation of β-piperidinoethyl chloride hydrochloride

In a 500 ml. three necked flask fitted with a stirrer, reflux condenser and dropping funnel and provided with means for directing a slow stream of dry air through the reaction flask is placed 65 g. (0.5 mol) β-piperidinoethyl alcohol, the product of paragraph (a) above. To the flask is then added a solution of 72 g. (0.6 mol) thionyl chloride dissolved in 100 ml. of dry chloroform at a rate sufficient to maintain the reaction temperature between 50° C. and 58° C. Following the addition of the thionyl chloride solution, the reaction mixture is heated on a steam bath at reflux temperature for one half hour. Upon cooling to room temperature, a crystalline solid separates from the reaction mixture and is collected on a filter and washed with dry ether. The combined ether washings and filtrate are evaporated to ⅓ its original volume and on cooling a second batch of crystals is obtained. The crystalline material is recrystallized from absolute ethanol and decolorized. The crystalline product after washing with ether and drying has a melting point of 206.5–208° C.

c. Preparation of β-piperidinoethyl 3-thienyl sulfide alcohol

Into a dry 500 ml. flask equipped with stirrer, reflux condenser and dropping funnel is poured 33 g. (0.25 mol) of 3-thiophenethiol dissolved in a solution containing 30 g. of sodium hydroxide and 100 ml. water. To the 3-thiophenethiol solution is added from a dropping funnel 28 g. (0.15 mol) of β-piperidinoethyl chloride hydrochloride, the product produced in paragraph (b) above, dissolved in 100 ml. of water. The reaction mixture is maintained at reflux temperature during the addition of the foregoing salt solution which requires approximately one hour. The reaction is continued for an additional one and a half hours, at the end of which a yellowish oil is separated. The aqueous layer remaining after the oil is separated and is extracted with 100 ml. portions of ether. The combined ether extracts and the oil are washed with 5% sodium hydroxide and with water to remove the unreacted 3-thiophenethiol. After drying with anhydrous sodium sulfate, the cooled ether solution is treated with dry hydrogen chloride until no further amine hydrochloride precipitates, the precipitate is collected on a Buchner funnel and the filtrate tested with hydrogen chloride gas to determine complete removal of the amine. The crude hydrochloride salt is dissolved in 100 ml. of hot, dry isopropyl alcohol and decolorized. Two recrystallizations form isopropyl alcohol, a final washing with dry ether, and thoroughly drying produces the white crystalline product having a melting point at 149.5–150.5° C.

EXAMPLE II

β-METHYL-β-PIPERIDINOETHYL 3-THIENYL SULFIDE HYDROCHLORIDE

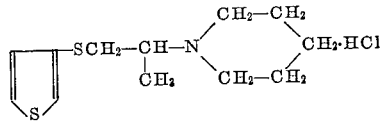

a. Preparation of α-methyl-β-piperidinoethyl chloride hydrochloride

Following the procedure described in Example Ia, 71 g. (0.5 mol) of α-methyl-β-piperidinoethyl alcohol is reacted with 89 g. (0.75 mol) of thionyl chloride dissolved in 100 ml. of dry chloroform. The yellow crystalline product of the foregoing reaction is recrystallized from 150 ml. of absolute ethanol to produce the colorless crystalline product having a melting point of 207.5–209° C.

b. Preparation of β-methyl-β-piperidinoethyl 3-thienyl sulfide

Following the procedure described in Example Ic, 33 g. (0.25 mol) of 3-thiophenethiol dissolved in a solution containing 30 g. of sodium hydroxide in 100 ml. of water is reacted with 20 g. (0.10 mol) of α-methyl-β-piperidinoethyl chloride hydrochloride, the product of column 4, line 45, dissolved in 100 ml. of water. The addition of the α-methyl-β-piperidinoethyl chloride hydrochloride solution requires approximately one hour which is followed by heating for an additional half hour at reflux temperature while stirring. The product is purified as described in paragraph Ic and the hydrochloride salt is crystallized from dry isopropyl alcohol to produce the crystalline hydrochloride salt product which melts at 172–173.5° C.

EXAMPLE III

γ-PIPERIDINOPROPYL 3-THIENYL SULFIDE HYDROCHLORIDE

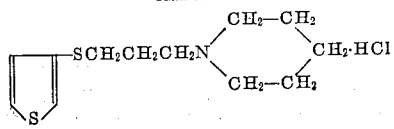

a. Preparation of γ-piperidinopropyl chloride hydrochloride

Following the procedure employed in Example I*b* 70 g. (0.5 mol) of γ-piperidinopropyl alcohol is reacted with a solution of 75 g. (0.65 mol) of thionyl chloride dissolved in 75 ml. of dry chloroform. The product of the foregoing reaction is purified in the manner described in Example I*b*, and after recrystallization from 180 ml. of dry ethanol the white crystalline product is obtained melting at 218–219.5° C.

b. Preparation of γ-piperidinopropyl 3-thienyl sulfide hydrochloride

In accordance with the procedure described in Example I*c*, 40 g. (0.2 mol) of γ-piperidinopropyl chloride hydrochloride in 100 ml. of water is reacted with 66 g. (0.5 mol) of 3-thiophenethiol dissolved in 100 ml. of water containing 40 g. of sodium hydroxide at a reflux temperature. Approximately two hours is required to complete the reaction. After purifying in the manner described in Example I*b* and finally recrystallizing from absolute ethanol, the pure crystalline hydrochloride salt is obtained having a melting point of 120–121° C.

EXAMPLE IV

δ-PIPERIDINOBUTYL 3-THIENYL SULFIDE HYDROCHLORIDE

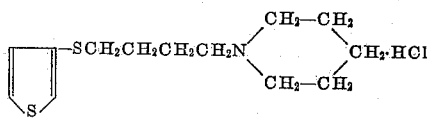

a. Preparation of δ-piperidinobutyl chloride hydrochloride

Following the general procedure as described in Example I*b* 15.7 g. (.1 mol) of δ-piperidinobutyl alcohol and 15 g. (0.125 mol) of thionyl chloride dissolved in 50 ml. of dry chloroform react to produce the crude product. Recrystallization of the crude product from a mixture of equal parts of ethanol and ether produces the white crystalline product having a melting point 160.5-161.5° C.

b. Preparation of δ-piperidinobutyl 3-thienyl sulfide chloride

Following the procedure of Example I*c*, 13.2 g. (.1 mol) of 3-thiophenethiol dissolved in a solution of 10 g. of sodium hydroxide in 30 ml. of water is reacted with 19 g. (0.05 mol) of δ-piperidinobutyl chloride hydrochloride in 30 ml. of water to produce an oily product after heating for one and a half hours at reflux temperature. After the usual purification procedure the hydrochloride salt of the product is recrystallized from a mixture of equal parts of ethanol and benzene to produce the pure crystalline product melting at 131–133° C.

EXAMPLE V

δ-PIPERIDINOBUTYL 3-(2-CHLORO)-THIENYL SULFIDE HYDROCHLORIDE

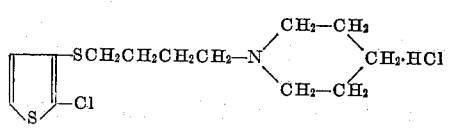

Following the procedure described in Example IV, 12 g. (.1 mol) of 3-(2-chloro)-thiophenethiol dissolved in a solution of 10 g. of sodium hydroxide in 30 ml. of water is reacted with 19 g. (.05 mol) of δ-piperidinobutyl chloride hydrochloride in 30 ml. of water to produce an oily product after heating for one and one half hours at reflux temperature. After purification in the previous described manner and recrystallization from a mixture of ethanol and benzene the pure white crystalline product is obtained.

EXAMPLE VI

ε-PIPERIDINOAMYL 3-THIENYL SULFIDE HYDROCHLORIDE

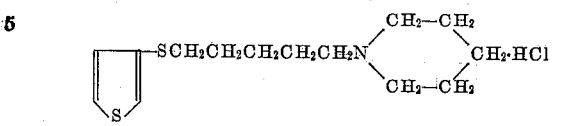

a. Preparation of ε-piperidinoamyl chloride hydrochloride

In accordance with the procedure described in Example I, 13.1 g. (0.11 mol) of thionyl chloride dissolved in 25 ml. of dry chloroform is added to 15 g. (0.088 mol) of ε-piperidinoamyl alcohol, prepared in the manner described in Example I, dissolved in 25 ml. of dry chloroform over a period of one hour. The foregoing mixture is heated to the reflux temperature for an additional half hour to produce a crude yellow crystalline product. After recrystallization from a mixture of equal volume of benzene and ethanol the pure crystalline material is obtained having a melting point of 138.5–140° C.

b. Preparation of ε-piperidinoamyl 3-thienyl sulfide hydrochloride

Employing 12 g. (0.053 mol) of ε-piperidinoamyl chloride hydrochloride and 50 ml. of water and 70 g. (0.06 mol) of 3-thiophenethiol dissolved in a solution containing 6 g. of sodium hydroxide in 50 ml. of water and following the procedure previously described in the preceding examples, there is obtained after recrystallization from an isopropyl alcohol in benzene mixture the crystalline product having a melting point of 89.5–91.5° C.

EXAMPLE VII

β-MORPHOLINOETHYL 3-THIENYL SULFIDE HYDROCHLORIDE

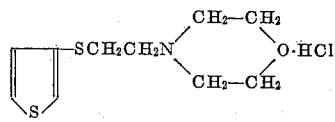

On reacting 11 g. (0.083 mol) of 3-thiophenethiol dissolved in a solution of 10 g. of sodium hydroxide in 50 ml. of water with 10.5 g. (0.056 mol) of β-morpholinoethyl chloride hydrochloride in 25 ml. of water, there is obtained an insoluble oil after two hours of heating at reflux temperature. After separating and bringing to the hydrochloride salt, the product is recrystallized from isopropyl alcohol to give the product having a melting point of 109–110.5° C. The free base is obtained by neutralizing a solution of the above salt with alkali.

EXAMPLE VIII

β-MORPHOLINOETHYL 3-(4-METHYL)-THIENYL SULFIDE HYDROCHLORIDE

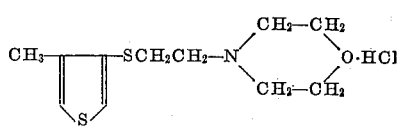

Following the procedure described in Example VII, 0.1 mol of 3-(4-methyl)thiophenethiol dissolved in a solution of 20 g. of sodium hydroxide in 100 ml. of water is reacted with 10 g. (.05 mol) of β-morpholinoethyl chloride hydrochloride in 25 ml. of water. An insoluble oil is obtained after heating at reflux temperature for about two hours. After recovering in the above described manner and recrystallizing from isopropyl alcohol the pure crystalline product is obtained.

EXAMPLE IX

β-METHYL-β-MORPHOLINOETHYL 3-THIENYL SULFIDE HYDROCHLORIDE

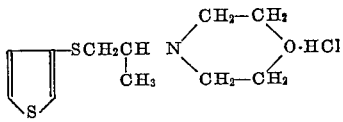

a. Preparation of β-methyl-β-morpholinoethyl chloride hydrochloride

Treating 35 g. (0.24 mol) of β-methyl-β-morpholinoethyl alcohol with 36 g. (0.3 mol) of thionyl chloride in 100 ml. of dry chloroform according to the previously described procedure results in the formation of a crude yellow product which upon recrystallization from dry ethanol gives the white crystalline solid having a melting point of 180–181.5° C.

b. Preparation of β-methyl-β-morpholinoethyl 3-thienyl sulfide hydrochloride The addition of 18 g. (0.15 mol) of 3-thiophenethiol dissolved in a solution containing 10 g. of sodium hydroxide and 25 ml. of water to 14 g. (0.07 mol) of β-methyl-β-morpholinoethyl chloride hydrochloride dissolved in 25 ml. of water results in the formation of an insoluble oily product after one and a half hours of heating and stirring at reflux temperatures. Using the previously described procedure of isolation and recrystallization from an isopropyl alcohol in benzene solvent containing a small amount of ether gives the pure crystalline product melting at 95–96° C.

EXAMPLE X

γ-MORPHOLINOPROPYL 3-THIENYL SULFIDE HYDROCHLORIDE

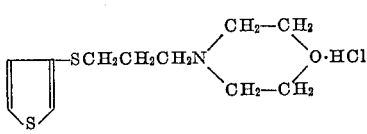

To 14 g. (0.07 mol) of γ-morpholinopropyl chloride hydrochloride dissolved in 25 ml. of water is added 18 g. (0.15 mol) of 3-thiophenethiol in 25 ml. of 10 Normal sodium hydroxide in accordance with the previously described procedure. After reaction is carried out as described above, a yellow oil separates which after purification and recrystallization of isopropyl alcohol gives the hydrochloride salt product having a melting point of 157–158.5° C.

EXAMPLE XI

γ-MORPHOLINOBUTYL 3-THIENYL SULFIDE HYDROCHLORIDE

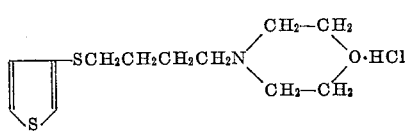

a. Preparation of δ-morpholinobutyl chloride hydrochloride

Addition from a dropping funnel of 31 g. (0.26 mol) of thionyl chloride dissolved in 25 ml. of dry chloroform to 40 g. (0.226 mol) of δ-morpholinobutyl alcohol dissolved in 25 ml. of dry chloroform during a period of one hour followed by heating at reflux temperature for thirty minutes gives a lightly colored reaction mixture after the usual procedure described heretofore. Upon isolating and recrystallizing from a mixture of equal parts of benzene and ethanol, the white crystalline solid is obtained having a melting point of 120–121° C.

b. Preparation of δ-morpholinobutyl 3-thienyl sulfide hydrochloride

To 7 g. (0.06 mol) of 3-thiophenethiol dissolved in a solution containing 6 g. of sodium hydroxide dissolved in 50 ml. of water is added by means of a dropping funnel a solution of 8 g. (0.037 mol) of δ-morpholino-butyl chloride hydrochloride in 50 ml. of water in accordance with the heretofore described procedure. Purification and recrystallization from isopropyl alcohol gives the crystalline hydrochloride salt product having a melting point at 148–149° C.

EXAMPLE XII

ε-MORPHOLINOAMYL 3-THIENYL SULFIDE HYDROCHLORIDE

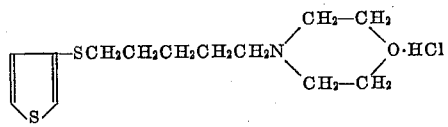

a. Preparation of ε-morpholinoamyl chloride hydrochloride

Reacting 15 g. (0.087 mol) ε-morpholinoamyl alcohol with 13.1 g. (0.11 mol) of thionyl chloride dissolved in 50 ml. of absolute chloroform results in a clear reaction mixture which upon separation of the clear product and purification by recrystallization from an isopropyl alcohol benzene mixture of equal parts yields the pure crystalline product having a melting point of 122.5–124° C.

b. Preparation of ε-morpholinoamyl 3-thienyl sulfide hydrochloride

Reacting 12 g. (0.052 mol) of ε-morpholinoamyl chloride hydrochloride and 50 ml. of water and 7 g. (0.06 mol) of 3-thiophenethiol dissolved in a solution of 6 g. of sodium hydroxide and 50 ml. of water produces an insoluble oil in a reaction period of one hour. Following the usual procedure of separation and recrystallization of the product from a benzene isopropyl alcohol mixture of equal parts gives the crystalline hydrochloride salt having a melting point of 135–136.5° C.

EXAMPLE XIII

β-PIPERIDINOETHYL 2-THIENYL SULFIDE HYDROCHLORIDE

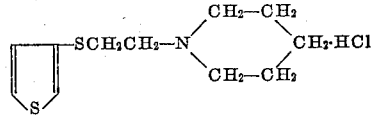

To a solution of 6.7 g. potassium hydroxide of 30 ml. of water is added 7 g. (0.6 mol) of 2-thiophenethiol and the mixture is heated at reflux temperature. To the heated mixture is added 7 g. (0.04 mol) of β-piperidinoethyl chloride hydrochloride dissolved in 20 ml. of water over a period of one half hour. The reaction mixture is refluxed for an additional hour and is subject to the previously described separation procedure to produce after two recrystallizations from ethanol in benzene mixture the crystalline product melting at 144–145.5° C.

EXAMPLE XIV

γ-MORPHOLINOPROPYL 2-THIENYL SULFIDE HYDROCHLORIDE

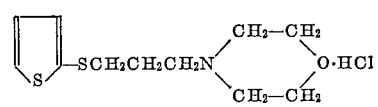

To a solution of 7 g. (0.06 mol) of 2-thiophenethiol heated at a reflux temperature is added dropwise 8 g. (0.049 mol) of γ-morpholinopropyl chloride over a period of one half hour. The reaction mixture is refluxed for an additional hour and allowed to cool. The oily layer which separates is taken up in ether and the aqueous layer extracted once with ether. Ether extracts are combined and treated with two 100 ml. portions of 5% hydrochloric acid and the aqueous layer is separated. By treating the aqueous solution with 10% potassium hydroxide solution the product separates as a yellowish oily layer and, taken up in ether and dried over anhydrous sodium sulfate. The ether solution is poured off and chilled and treated with a slow stream of dry hydrogen chloride. The product separates as a white solid and is filtered off. Crystallization from a solvent mixture of dry ethanol and benzene produces the pure crystalline product melting at 141.5–142° C.

EXAMPLE XV

γ-Morpholinopropyl 2-(5-Chloro)-thienyl Sulfide Hydrochloride

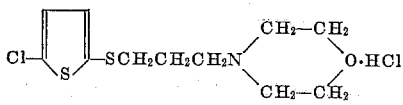

Following the procedure of Example XIV, 6 g. (0.05 mol) of 2-(5-chloro)thiophenethiol heated at reflux temperature is added dropwise to 9 g. (0.05 mol) of γ-morpholinopropyl chloride over a period of one hour. The reaction mixture is refluxed for an additional half hour and allowed to cool. The oily layer which forms is treated in the above described manner and upon crystallization from a solvent mixture of dry ethanol and benzene the pure crystalline product is obtained.

EXAMPLE XVI

β-(4-Pipecolino)-ethyl 3-Thienyl Sulfide Hydrochloride

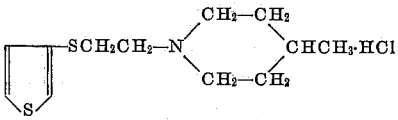

By following the general procedure described in Example Ic, 30 g. (0.2 mol) of 3-thiophenethiol dissolved in 30 g. of sodium hydroxide and 100 ml. of water is added to 20 g. (0.1 mol) of β-(4-pipecolino)-ethyl chloride hydrochloride prepared in the manner described in Example Ib dissolved in 100 ml. of water. The reaction mixture is treated as described in Example Ic and after dissolving the crude hydrochloride salt and isopropyl alcohol and thoroughly drying, the white crystalline product is obtained.

EXAMPLE XVII

β-Pyrrolidinoethyl 3-Thienyl Sulfide Hydrochloride

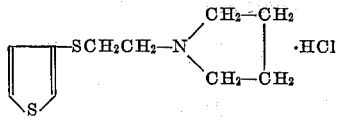

In accordance with the procedure described in Example Ic, 30 g. (0.2 mol) of 3-thiophenethiol dissolved in a solution containing 30 g. of sodium hydroxide and 100 ml. of water is added to 25 g. (0.15 mol) of β-pyrrolidinethyl chloride hydrochloride, prepared by the procedure described in Example Ib, dissolved in 100 ml. of water. After treating the reaction mixture as described in Example Ic, the crude hydrochloride salt is re-crystallized from isopropyl alcohol and thoroughly dried to produce the desired white crystalline product.

EXAMPLE XVIII

δ-Morpholinobutyl 3-Thienyl Sulfide Hydrochloride

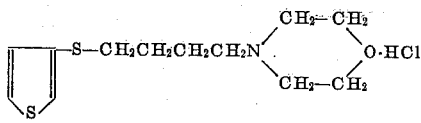

a. Preparation of δ-morpholinobutyl 3-thienyl sulfide hydrochloride

In accordance with the second general procedure for preparing the aminoalkyl sulfides described heretofore, 7 g. (0.034 mol) of δ-chlorobutyl 3-thienyl sulfide and 6 g. (0.07 mol) of morpholine are added to 50 ml. of dry benzene and allowed to stand with occasional shaking for a period of one half hour. Following this the solution is heated at reflux temperature for four hours at the end of which no additional morpholine hydrochloride is observed. Upon cooling to room temperature the reaction mixture is made basic and steam distilled until Simon's test for secondary amines show the complete removal of excess morpholine. The solution remaining in the distillation flask is made acidic with 4-Normal hydrochloric acid and extracted twice with ether to remove reacted δ-chlorobutyl 3-thienyl sulfide. On neutralization with 4-Normal sodium hydroxide a brownish oil separates which is extracted twice with ether and dried over with anhydrous sodium sulfate. Dry hydrogen chloride is slowly passed into the above ether solution to form the hydrochloride which separates as a clear oil. The product is crystallized by seeding the oil with a crystal of the pure compound and after recrystallization from isopropyl alcohol, produces the product melting at 146.5–148° C. No depression in melting point is observed when a sample of the instant product is mixed with a sample with the substance prepared by the first described general method.

b. Preparation of δ-chlorobutyl 3-thienyl sulfide

To 54 g. (0.45 mol) of thionyl chloride is added dropwise a solution of 68 g. (0.36 mol) of δ-hydroxybutyl 3-thienyl sulfide dissolved in 35 g. of pyridine. The foregoing reaction is carried out in a three necked flask fitted with a stirrer, dropping funnel, and reflux condenser with provisions made for drawing a stream of dry air across the surface of the reaction mixture. Stirring is maintained during the addition of the thionyl chloride and at intervals the reaction flask is immersed in an ice bath to control the exothermic reaction which takes place. The addition of the thionyl chloride requires an hour after which reaction mixture is allowed to cool to room temperature. The crude brown oily product is washed with water, dissolved with dry ether, and dried with sodium sulfate. After removal of the ether by distillation, the oil is distilled under vacuum to produce the greenish oily product boiling at a temperature of 131° C. at a pressure of 1.5 mm. of mercury.

c. Preparation of δ-hydroxybutyl 3-thienyl sulfide

In a 500 ml. three necked flask fitted with a stirrer and reflux condenser is placed 87 g. (0.75 mol) of 3-thiophenethiol dissolved in a solution of 35 g. of sodium hydroxide and 150 ml. of water. To this solution is added drop-wise while stirring 65 g. (0.60 mol) of tetramethylene chlorohydrin over a period of one half hour. Immediately following the addition of the chlorohydrin the reaction mixture is heated to reflux temperature for an hour and allowed to cool to room temperature. The yellow oil which forms is separated in a separatory funnel and the aqueous fraction extracted with ether. The combined ether extracts and oil are washed with water and dried over anhydrous sodium sulfate followed by removal of the ether and distillation. The oil is vacuum

EXAMPLE XIX

β-CHLOROETHYL 3-THIENYL SULFIDE

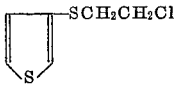

Following the procedure of Example XVIIIb, 50 g. (0.43 mol) of 3-thiophenethiol is dissolved in a solution of 18 g. of sodium hydroxide and 200 ml. of water the resulting solution is poured into a 1,000 ml. flask fitted with a reflux condenser, stirrer, and dropping funnel. The stirred mixture is heated to reflux temperature and 73 g. (0.5 mol) of ethylenechlorobromide is added slowly over a period of one half hour. The reaction is allowed to continue an additional hour after the addition of ethylenechlorobromide is complete. Upon cooling to room temperature, a heavy yellow oil separates and this is collected in a separatory funnel. The aqueous layer is extracted with 100 ml. portions of ether which is added to the oil. The resulting ether solution is washed with water followed by drying over anhydrous sodium sulfate. The ether is removed by distillation and the yellow oil remaining has fractionated under vacuum there is a few ml. of forerun followed by a slightly yellow clear oil having a boiling point of 123° C. at a pressure of 8 mm. of mercury.

EXAMPLE XX

β-HYDROXYETHYL 3-THIENYL SULFIDE

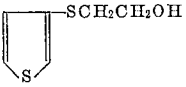

Following the procedure given in Example XVIIIc, 35 g. (0.3 mol) of 3-thiophenethiol dissolved in a solution of 15 g. sodium hydroxide and 150 ml. of water is reacted with 28 g. (0.35 mol) of ethylene chlorohydrin. A yellow oily layer is obtained after a reaction period of one hour. Separation and vacuum distillation gives the product which distills at a temperature of 116–117° C. at a pressure of 2 mm. of mercury.

EXAMPLE XXI

β-METHYL-β-HYDROXYETHYL 3-THIENYL SULFIDE

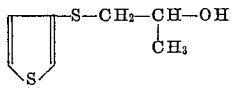

Following the procedure of Example XVIIIc, 58 g. (0.5 mol) of 3-thiophenethiol dissolved in 30 g. sodium hydroxide and 150 ml. of water is reacted with 57 g. (0.6 mol) of propylene chlorohydrin. After the separating a liquid product is distilled giving a clear yellow oil at a boiling point of 116° C. at a pressure of 5 mm. of mercury.

EXAMPLE XXII

δ-DIBUTYLAMINOBUTYL 3-THIENYL SULFIDE HYDROCHLORIDE

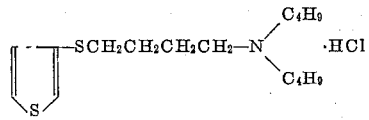

Following the procedure given in Example XVIIIa, 10 g. (0.08 mol) of n-dibutylamine in 50 ml. of dry benzene were added to 7 g. (0.034 mol) of δ-chlorobutyl 3-thienyl sulfide and allowed to stand with occasional shaking for a period of one-half hour. After refluxing, removal of excess amine, and further purification in the previously described manner, the pure crystalline product is obtained.

EXAMPLE XXIII

γ-BUTYLAMINOPROPYL 3-THIENYL SULFIDE HYDROCHLORIDE

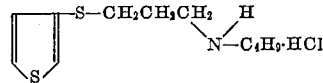

Following the procedure of Example XVIIIa, 7 g. (0.1 mol) n-butyl amine in 50 ml. of dry benzene were added to 7 g. (0.036 mol) of γ-chloropropyl 3-thienyl sulfide and allowed to stand with occasional shaking for a period of one hour. After refluxing, removal of excess amine and further purification in the previously described manner, the pure crystalline product is obtained.

The several compositions of the preceding examples which can be designated broadly as ω-(substituted amino)-alkyl thienyl sulfides have the general formula

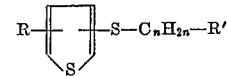

wherein R represents a hydrogen, methyl or halogen; $n$ represents an integer having a value between 2 and 5 inclusive; and R' represents an alkylamino, piperidino, morpholino, pipecolino, or pyrrolidino group. The several above compositions and the water soluble salts thereof when tested by the guinea pig intracutaneous tests show generally pronounced local anesthetic activity in the range of performance of procaine and have generally caused no untoward reaction in humans. The free bases which are generally formed by neutralizing a solution of the hydrochloride salt with alkali form water soluble salts when treated with inorganic and organic acids and are converted to the water soluble quaternary salts when treated with alkyl halides, dialkyl sulfides, and aralkyl halides.

Others may readily adapt the invention for use under various conditions of service, by employing one or more of the novel features disclosed or equivalents thereof. As at present advised with respect to the apparent scope of my invention, I desire to claim the following subject matter.

I claim:

1. The method of preparing a composition having the formula

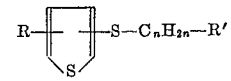

wherein R is selected from the group consisting of hydrogen, methyl and chlorine; $n$ an integer having a value between 2 and 5 inclusive; and R' represents a substituted amino group selected from the class consisting of alkylamino, symmetrical dialkylamino, unsymmetrical dialkylamino, piperidino, morpholino, pipecolino, and pyrrolidino, said alkylamino, symmetrical dialkylamino, and unsymmetrical dialkylamino having a maximum of 8 carbon atoms per group which comprises reacting in the presence of a solvent a halide of the formula

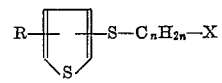

wherein R and $n$ have the above mentioned values and X represents a halogen with an amine having the formula

R'—NH wherein R' has the above mentioned values.

2. A method of preparing the composition having the formula

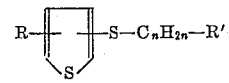

wherein R is selected from the group consisting of hydrogen, methyl, and chlorine; n an integer having a value between 2 and 5 inclusive; and R' represents a substituted amino group selected from the class consisting of alkylamino, symmetrical dialkylamino, unsymmetrical dialkylamino, piperidino, morpholino, pipecolino, and pyrrolidino group, said alkylamino, symmetrical dialkylamino and unsymmetrical dialkylamino having a maximum of 8 carbon atoms per group, which comprises reacting in the presence of a solvent a mercaptan of the formula

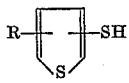

wherein R has the above given value with a halide of the formula $$R'—C_nH_{2n}—X$$

wherein R' and n have the above given values and X represents a halogen.

3. A new composition of matter selected from the group consisting of compounds having the general formula

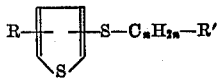

wherein R is selected from the group consisting of a hydrogen, methyl and chlorine; n an integer having a value between 2 and 5 inclusive; and R' is selected from the group consisting of an alkylamino, an unsymmetrical dialkylamino, a symmetrical dialkylamino, a piperidino, a morpholino, a pipecolino, and a pyrrolidino group, said alkylamino, unsymmetrical dialkylamino and symmetrical dialkylamino having a maximum of 8 carbon atoms per group; and the water soluble salts thereof.

4. A new composition of matter comprising an ω-(N,N-dialkylamino) alkyl-3-thienyl sulfide, said dialkylamino group having a maximum of 8 carbon atoms and said alkyl group having at least 2 and a maximum of 5 carbon atoms.

5. A new composition of matter comprising an acid salt of a -morpholino lower alkyl 3-thienyl sulfide.

6. A new composition of matter comprising of an acid salt of a -piperidino lower alkyl 3-thienyl sulfide.

7. As a new composition of matter, γ-dibutylaminopropyl 3-thienyl sulfide hydrochloride.

8. As a new composition of matter, β-methyl-β-piperidinoethyl 3-thienyl sulfide hydrochloride.

9. As a new composition of matter, γ-morpholinopropyl 3-thienyl sulfide hydrochloride.

10. As a new composition of matter, β-morpholinoethyl 3-thienyl sulfide hydrochloride.

11. As a new composition of matter, γ-morpholinopropyl 2-thienyl sulfide hydrochloride.

References Cited in the file of this patent

UNITED STATES PATENTS

| | | |
|---|---|---|
| 2,480,832 | Brooks et al. | Sept. 6, 1949 |
| 2,577,566 | Brooks | Dec. 4, 1951 |
| 2,662,900 | Brooks | Dec. 15, 1953 |